(12) United States Patent
Rodriguez et al.

(10) Patent No.: US 11,951,430 B2
(45) Date of Patent: Apr. 9, 2024

(54) HEATING VENTILATION AND AIR CONDITIONER FILTER WITH USER CUSTOMIZABLE FILTER ELEMENTS

(71) Applicant: Papeltec Overseas, Inc., Atlantic Beach, FL (US)

(72) Inventors: Peter A. Rodriguez, Jacksonville, FL (US); Jason Rodriguez, Jacksonville, FL (US); Craig Austin, Jacksonville, FL (US)

(73) Assignee: Papeltec Overseas, Inc., Atlantic Beach, FL (US)

( * ) Notice: Subject to any disclaimer, the term of this patent is extended or adjusted under 35 U.S.C. 154(b) by 0 days.

(21) Appl. No.: 18/130,476

(22) Filed: Apr. 4, 2023

(65) Prior Publication Data

US 2023/0311044 A1    Oct. 5, 2023

Related U.S. Application Data

(60) Provisional application No. 63/326,929, filed on Apr. 4, 2022.

(51) Int. Cl.
| | | |
|---|---|---|
| B01D 46/00 | (2022.01) | |
| B01D 46/12 | (2022.01) | |
| B01D 46/62 | (2022.01) | |
| B01D 46/88 | (2022.01) | |
| F24F 8/108 | (2021.01) | |

(52) U.S. Cl.
CPC ......... *B01D 46/0005* (2013.01); *B01D 46/12* (2013.01); *B01D 46/62* (2022.01); *B01D 46/88* (2022.01); *F24F 8/108* (2021.01); *B01D 2265/027* (2013.01); *B01D 2265/028* (2013.01); *B01D 2271/02* (2013.01); *B01D 2279/50* (2013.01)

(58) Field of Classification Search
CPC .... B01D 46/0005; B01D 46/12; B01D 46/88; B01D 2265/027; B01D 2265/028; B01D 2271/02; B01D 2279/50
USPC .............. 55/385.2, 482, 486, 490, 491, 497
See application file for complete search history.

(56) References Cited

U.S. PATENT DOCUMENTS

| | | | | |
|---|---|---|---|---|
| 4,518,405 | A | * | 5/1985 | Lough ................... B01D 46/12 55/385.2 |
| 5,342,423 | A | | 8/1994 | Taft |
| 5,364,458 | A | | 11/1994 | Burnett et al. |
| 5,797,975 | A | * | 8/1998 | Davis ................... B01D 46/12 55/491 |

(Continued)

OTHER PUBLICATIONS

International Search Report and Written Opinion issued in correlated international application No. PCT/US23/17373 dated Jun. 21, 2023.

*Primary Examiner* — Minh Chau T Pham
(74) *Attorney, Agent, or Firm* — Tracnik Law PLLC; Joseph P. Kincart (57) ABSTRACT

The present disclosure provides methods and apparatus for user customizable configurations and replacement of a heating, ventilation and air conditioning filter media and frames. A filter media may be combined with a media frame according to user specifications. One filter media or combinations of multiple filter media may be chosen by a user to create custom filter configurations. Filter media may be separated from the media frame and disposed of in a manner generally more convenient than traditional HVAC filter replacement.

19 Claims, 10 Drawing Sheets

(56) References Cited

U.S. PATENT DOCUMENTS

| | | | | |
|---|---|---|---|---|
| 6,007,596 | A * | 12/1999 | Rosen | B01D 46/0002 55/491 |
| 6,533,835 | B2 * | 3/2003 | Wilson | B01D 46/10 55/482 |
| 7,261,757 | B2 * | 8/2007 | Duffy | B01D 46/521 55/497 |
| 8,721,754 | B2 * | 5/2014 | Mann | B01D 46/42 55/497 |
| 8,784,528 | B2 * | 7/2014 | Gorman | B01D 46/0005 55/497 |
| 8,814,994 | B2 * | 8/2014 | Wiser | B03C 3/366 96/88 |
| 9,174,154 | B1 * | 11/2015 | Tang | B01D 46/0005 |
| 10,245,542 | B2 * | 4/2019 | Knuckles | B01D 46/0016 |
| 2002/0100264 | A1 | 8/2002 | Rivera et al. | |
| 2009/0044702 | A1 * | 2/2009 | Adamek | B01D 46/546 55/486 |
| 2009/0044703 | A1 * | 2/2009 | Bias | B03C 3/12 95/2 |
| 2014/0096494 | A1 | 4/2014 | Wiser, III et al. | |
| 2023/0089672 | A1 * | 3/2023 | Mok | B01D 46/0001 55/497 |

\* cited by examiner

HEATING VENTILATION AND AIR CONDITIONER FILTER WITH USER CUSTOMIZABLE FILTER ELEMENTS

CROSS REFERENCE TO RELATED APPLICATIONS

This application claims priority to U.S. Provisional Application No. 63/326,929, filed Apr. 4, 2022, and entitled HEATING VENTILATION AND AIR CONDITIONER FILTER WITH REPLACEABLE AND DISPOSABLE ELEMENT, the entire disclosures of which are incorporated herein by reference.

FIELD OF THE DISCLOSURE

The present disclosure relates to methods and apparatus to customize a heating ventilation and air conditioning ("HVAC") filter element and replace the element in a clean and efficient manner.

BACKGROUND OF THE DISCLOSURE

Proper maintenance of residential and commercial building HVAC filters is an essential and expensive aspect of HVAC servicing. Essentially, commonly used HVAC filters include a light cardstock frame glued around a panel of filter media. A variety of designs have been promoted over the decades, but those most commonly found in home improvement and hardware stores are designed and priced to satisfy the public's desire for convenience. Known filters are flimsy and can be crushed or distorted if not handled correctly, and are subject to damage in shipment and storage. The known filters do not survive moisture as may occur if the evaporator coil drips on them or the condensate pan overflows. And due to their semi-rigid construction, they are likely to contaminate the home interior if handled roughly when changed and are not conveniently deposited in a trash container or bag.

SUMMARY OF THE DISCLOSURE

Accordingly, the present invention provides methods and apparatus for improved ways of replacing a filter element. According to the present invention, a filter frame can be reloaded with new filter media of the homeowner's preference. The frame is made in two parts that are clamped together by clips. The frame can be opened easily without disturbing the filter media, reducing the risk of contaminating the home. Also, the spent media can be folded on itself to trap the accumulated dust for easy transport through the home or to be conveniently deposited in a common household trash receptacle.

The performance of the filter is not compromised by mishandling of the flexible filter media, as the media can be flattened and straightened before being clamped in the frame in the optimum condition. The filter media itself is presumed to be a small contributor to the cost of common filters, which makes the invention an economical alternative where only the media is exchanged and disposed of.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for apparatus and methods for an HVAC type filter frame and reloadable filter media wherein a soiled filter media may be disposed, and a new filter media may be placed into the HVAC filter frame; or the soiled filter media may be cleaned and replaced into the HVAC filter frame.

The present invention includes a filter frame that can be reloaded with new filter media of a user's preference. The frame includes two or more parts that are clamped together by clips (or otherwise fixedly attached to each other). The frame can be opened easily with minimal or no disturbance of the filter media, reducing the risk of contaminating the home or other proximate environment. Spent or soiled media can be folded on itself to trap the accumulated dust for easy transport through the home or to be conveniently deposited in a common household trash receptacle.

The performance of the filter is not compromised by mishandling of the flexible filter media, as the media can be flattened and straightened before being clamped in the frame in the optimum condition. The filter media itself is presumed to be a small contributor to the cost of common filters, which makes the invention an economical alternative where only the media is exchanged and disposed of.

Additionally, where the choice of filter performance features is preselected by manufacturers, a filter frame with replaceable media allows the homeowner to select filter media to suit his particular needs. Pet hair prefilters, carbon postfilters, self-charging electrostatic media, double thicknesses for higher MERV ratings, more or less costly media to suit varying budgets, and combinations of these are all possible with one or more reloadable filter frames. Even the performance of deep pleated filters can be approximated by stacking filter frames in the same space where the long tortuous path through multiple thicknesses and media types increases the likelihood of particulates becoming lodged in the media fibers.

As filter media of many types are common articles of commerce, the invention focuses on features of a reloadable filter frame. Although the frame could be made of many types of material, it seems most efficient to manufacture it from four basic components: 1) a plastic extrusion of a unique profile that serves as both the upper and lower filter frame, 2) injection-molded plastic corners to secure the four sides of the filter frame to each other, 3) durable clips to fasten the upper and lower frames together with the edges of the filter media compressed and secured between them, and 4) wires laid across the filter media on the downstream side to prevent the media from ballooning in the direction of air flow.

Several illustrations are presented to further explain the construction and benefits.

Insert

Figure 1:
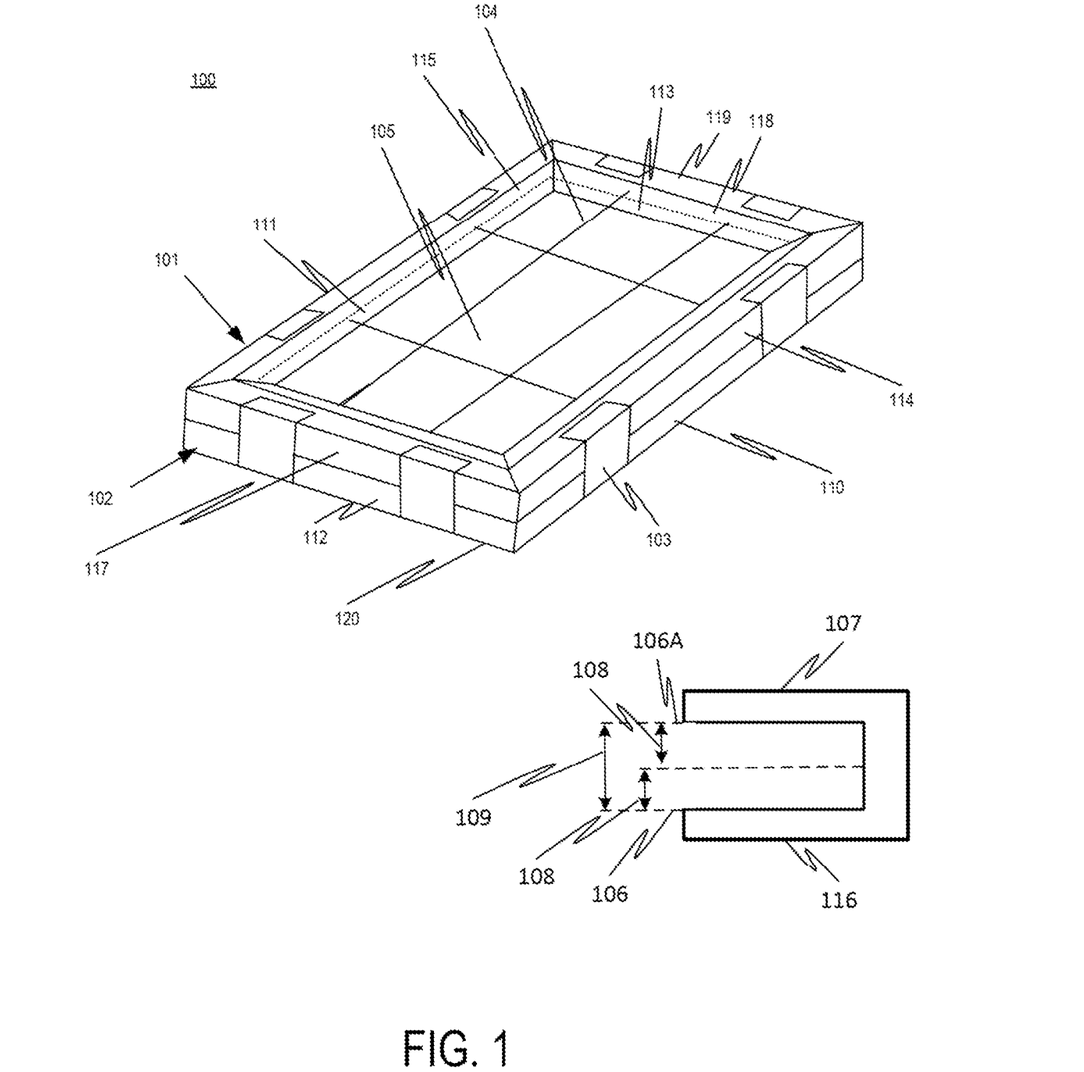
FIG. 1 illustrates a schematic view of a user customizable HVAC filter.

Referring now to FIG. 1, a schematic view of some embodiments of a user customizable HVAC filter 100 apparatus assembly is illustrated. As illustrated, a user customizable HVAC filter 100 apparatus (or cartridge) assembly may include multiple parts integrated together. For example, an upper media frame 101 and a lower media frame 102 may be assembled to provide perimeter support for one or more filter media 105 secured via compression or adhesion or fastener between the upper media frame 101 and the lower media frame 102.

The upper media frame 101 and the lower media frame 102 may be joined together with one or multiple frame fasteners 103. One or more media support 104 are positioned within one or both of the upper media frame 101 and the lower media frame 102 to facilitate maintaining proper positioning of the filter media 105 with the perimeter of the upper media frame 101 and the lower media frame 102.

As discussed further with reference to FIG. 1 below, the frame fastener(s) 103 may include, by way of non-limiting example, one or more of: clips, C clips, threaded fasteners, and quick disconnect fasteners.

The lower media frame 102 may include a lower surface 106 that is sized to interact with an HVAC unit into which the customizable HVAC filter cartridge 100 in inserted. For example, the HVAC unit may include a lower equipment engagement feature 116 with one or more planar surfaces that interact with sides of the lower media frame 102. In some preferred embodiments, lower equipment engagement feature 116 will include three planar surfaces forming a U shape that is sized and positioned to receive three sides of the lower media frame 102, such as, for example, three of: a right lower media frame side 110, a left lower media frame side 111, a front lower media frame side 112 and a back lower media frame side 113 which make up an exterior perimeter of the lower media frame 102. The lower equipment engagement feature 116 will be of a suitable size and shape (i.e., 108 & 109 as shown in FIG. 1) to secure the customizable HVAC filter cartridge 100 in the HVAC unit into which the customizable HVAC filter cartridge 100 is installed.

Similarly, an upper media frame 101 may include an upper surface 106A that is sized to interact with an HVAC unit into which the customizable HVAC filter 100 in inserted. For example, the HVAC unit may include an upper equipment engagement feature 107 with one or more planar surfaces that interact with sides of the upper media frame 101. In some preferred embodiments, the upper equipment engagement feature 107 will include three planar surfaces forming a U shape that is sized and positioned to receive three sides of the upper media frame 101, such as, for example, three of: a right upper media frame side 114, a left upper media frame side 115, a front upper media frame side 117 and a back upper media frame side 118 which make up an exterior perimeter of the upper media frame 101. The upper equipment engagement feature 107 will be of a suitable size and shape to secure the customizable HVAC filter 100 in the HVAC unit into which the customizable HVAC filter 100 is installed.

The customizable HVAC filter cartridge 100 may include one or more user selected media layers 105 secured in between the upper media frame 101 and the lower media frame 102. In preferred embodiments, the one or more user selected media layers are secured with media engagement compressors (described more fully in FIG. 2). Each media layer may be specific to a particular type of filtering to be accomplished with a deployed customizable HVAC filter 100. Such as, by way of non-limiting example, a first media layer may be included to filter out airborne particulate of a larger size, and a second media layer may be included to filter out airborne particulate of a smaller size, a third media layer may be included to filter out allergens, a fourth filter media layer may be included to provide electrostatic filtering, and other media filters of almost any type may be included to accomplish a user selectable purpose. A user may assemble a filter according to their immediate purpose or need or circumstance. For example, different filter media may be used during one or more of: different seasons and/or climatic conditions; use of a fireplace; during heavy cooking; to filter an environment containing pet dander and/or fur; to filter an environment containing humans with sensitivities; or other circumstance. Each filter media may include physical characteristics such that the media may be fixedly securable between a lower media engagement compressor and an upper media engagement compressor.

In another aspect of the present invention, media supports 104 may be included to support the media and prevent airflow and/or gravity from displacing the media from its position secured between the media engagement compressors.

One or more frame fasteners 103 may secure the upper media frame 101 to the lower media frame 102 with the filter media suspended between the upper media frame 101 and the lower media frame 102 and bound to the upper media frame 101 and lower media frame 102 via compression.

In some embodiments, a lower media frame 102 and the upper media frame 101 are polygon shaped with four sides and four interior angles such that a sum of the interior angles equals 90 degrees.

Some embodiments include a right lower media frame side 110 and a left lower media frame side 111 that are parallel to each other and the front lower media frame side 112 and the back lower media frame side 113 are parallel to each other.

Some embodiments may additionally include a flexible edge around one of the upper media frame 101 and the lower media frame 102. The flexible edge may provide a seal against an equipment engagement feature 107 & 116.

In another aspect, a top surface of the upper media frame 119 may be parallel to a bottom surface of the lower media frame 120 while the upper media frame 101 is releasably secured to the lower media frame 102.

Further, at least one of the upper media frame 101 and the lower media frame 102 comprises a perimeter surface at a 90 degree angle to a top surface of the upper media frame and a bottom surface of the lower media frame 102.

Figure 2:
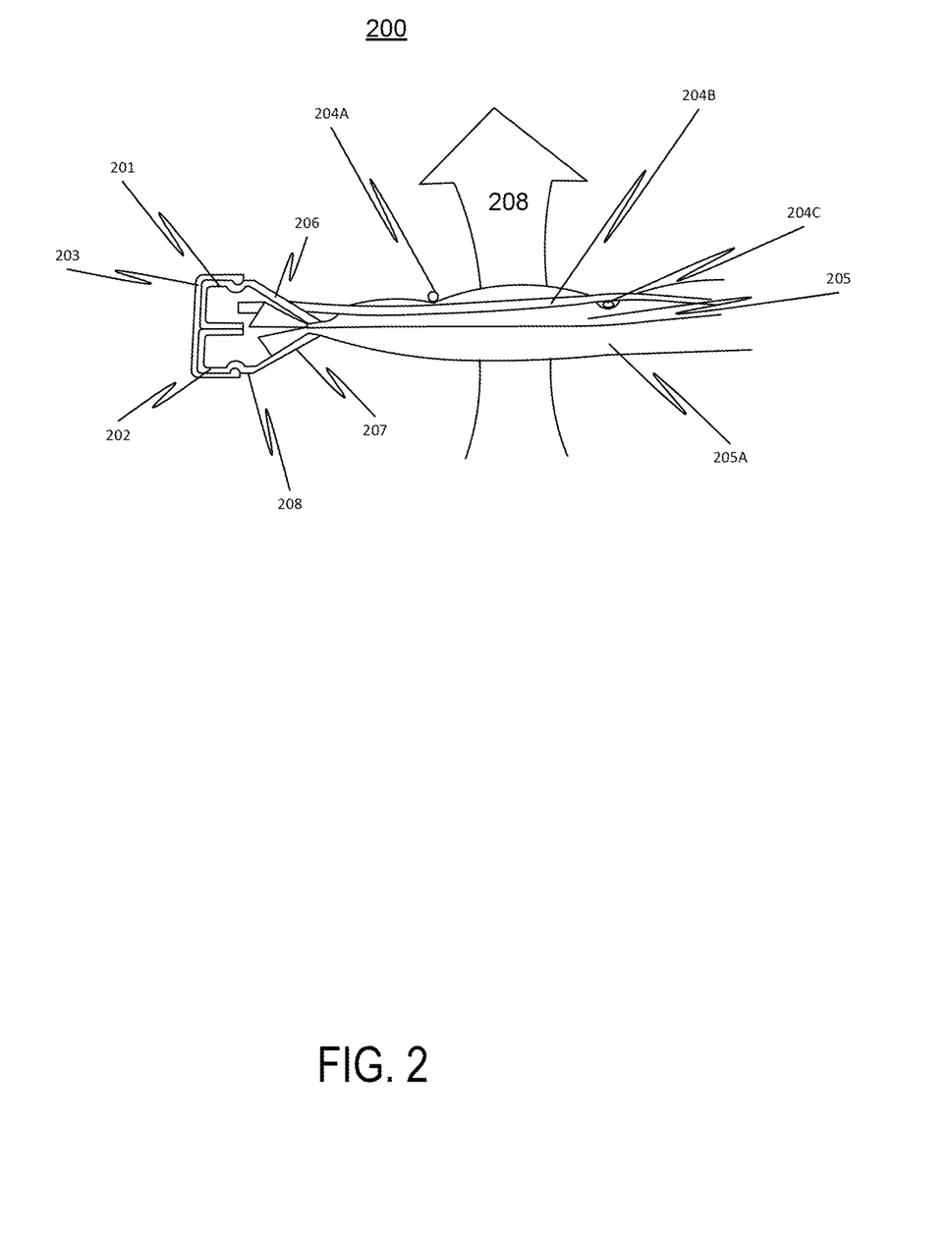
FIG. 2 illustrates a schematic view of a cross section of a user customizable HVAC filter.

Referring now to FIG. 2, a schematic diagram illustrates a cross section view of various components that may be included in a user customizable HVAC filter cartridge 200 apparatus. A cross section of the user customizable HVAC filter 200 illustrates how the upper media frame 201 may be releasably secured to the lower media frame 202 via a frame fastener 203. One or more media layers, which may include a first filter media layer 205 and second filter media layer 205A, may be releasably secured, such as for example via compression between the lower media engagement compressor 207 (around an interior circumference or boundary of the lower media frame 102 as shown in FIG. 2) and an upper media engagement compressor 206 (around an interior circumference or boundary of the upper media frame 101 as shown in FIG. 2).

Other devices may also be used in conjunction with or independent of lower media engagement compressors 207 and upper media engagement compressors 206, such as, by way of non-limiting example, via hook and loop, via fastener via adhesive, or other means of releasably attaching the filter media 205-205A to one or both of the upper media frame 201 and the lower media frame 202.

In addition, a first media support 204A may span between one of: the right lower media side 110 to the left lower media side 111, the right upper media frame side 114 to the left upper media side 115, the front lower media frame side 112 to the back lower media frame side 113, and the front upper media frame side 117 to the back upper media frame side 118 (see FIG. 1).

Multiple additional media supports 204B-204C, such as, for example, a second media support 204B and a third media support 204C may also span between the media frame sides 111-115, 117-118 in a similar manner. In some preferred embodiments, the multiple media supports 204A-204C are interweaved to provide additional stability and to minimize rattling or other noise generated by airflow 208 moving the filter media 205-205A against the multiple media supports 204A-204C. Media supports may be fashioned, for example, out of metal wire, as a plastic dowel, or as a plastic or metal plastic surface.

In another aspect, multiple frame fasteners 203 engageable with the lower media frame 202 and the upper media frame 201 to releasably secure the lower media frame 202 to the upper media frame 201 with the first media layer 205 and the second media layer 205A between the lower media engagement compressor 207 and the upper media engagement compressor 206.

Further, at least one of the multiple frame fasteners comprises a C shaped clip with a top surface and a bottom surface of the C shaped clip perpendicular to a side surface of the C shaped clip.

Further, a gasket over the C shaped clip and at least one of the lower media frame 102 lower surface and the upper media frame 101 upper surface.

The top surface of the C shaped clip is coplanar with the upper surface of the upper media frame 101 while the engages the upper media frame 101.

The lower or bottom surface of the C shaped clip is coplanar with the lower surface of the lower media frame 102 while the engages the lower media frame 102.

Further, at least one of the multiple frame fasteners comprises a threaded fastening device.

The at least one of the multiple frame fasteners is either coplanar, or below a planar surface, of one of the lower media frame 102 lower surface and the upper media frame 101 upper surface while the at least one of the multiple frame fasteners engages the upper media frame 101 and the lower media frame 102.

Further at least one of the multiple frame fasteners comprises a quick release fastener capable of securing the upper media frame to the lower media frame 102 via placement of the quick release fastener into a receiver and rotation of the quick release fastener for 180 degrees or less.

A compilation of multiple pairs of the lower media frame 102 and the upper media frame 101 stacked one on top of the other with a disparate respective filter media secured between each of the multiple pairs of the lower media frame 102 and the upper media frame 101.

Figure 3:
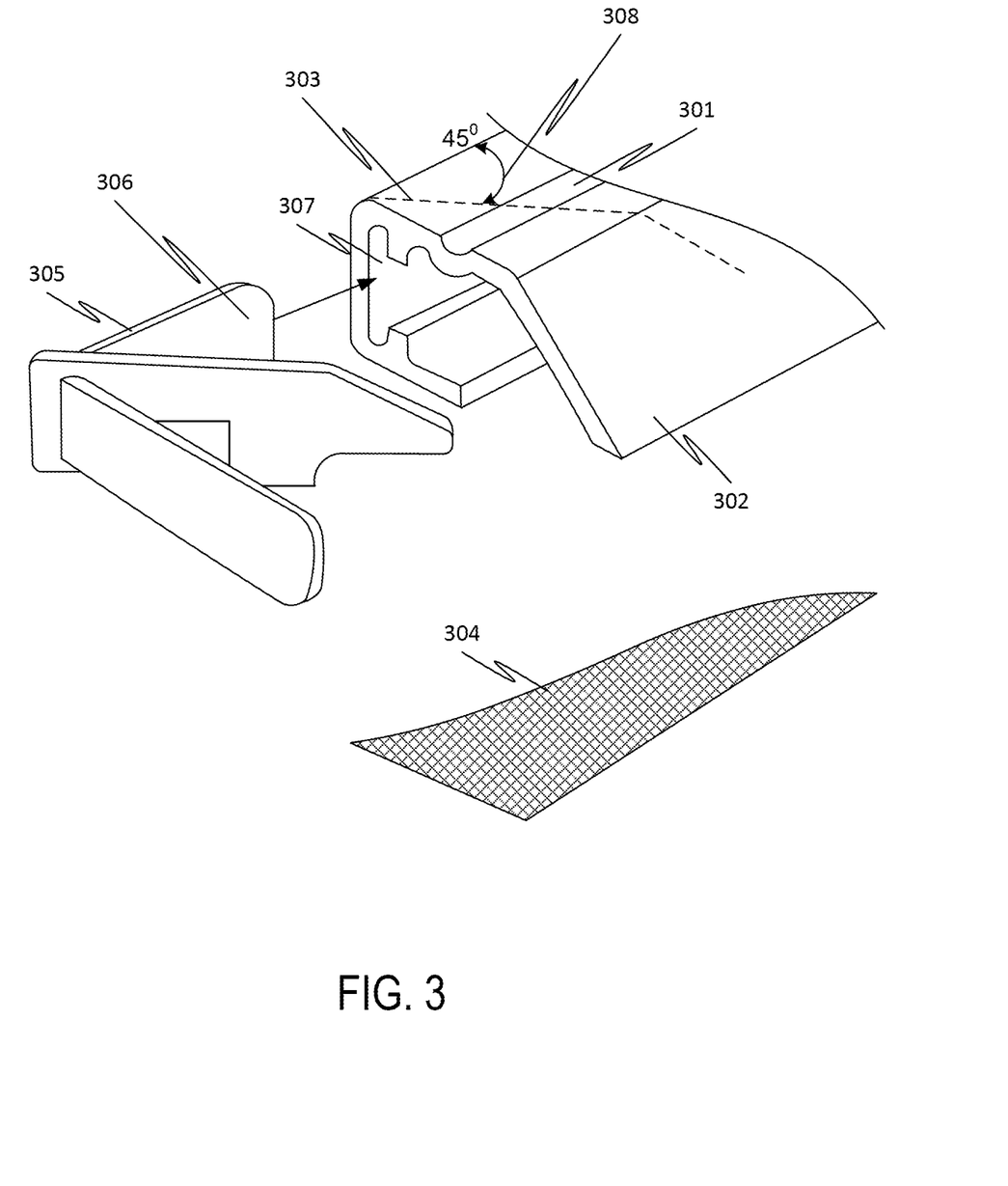
FIG. 3 illustrates a schematic view of a corner fastener and extruded media frame.

Referring now to FIG. 3 in some embodiments, extruded media frame 301 may be manufactured in longer lengths and cut and assembled according to the dimensions of a particular HVAC unit in which it will be used, or other use. A cross section of an extruded media frame 301 illustrates how the media frame 301 may be integrated with the media engagement compressor 302. In addition, a corner fastener 305 may be used to connect adjacent lengths of media frame 301 to form a corner. The media frame may be cut at a 45 degree angle 308 and secured together by a corner fastener tongue 306 fitted into a media frame groove 307. Filter medium 304 may also be cut to dimension to properly fit within a media frame 301 cut to size and assembled with corner fasteners 305.

It should be noted that media frames 301 and corner fasteners may be molded in various sizes and shapes to accommodate a wide range of uses. For example, corner fasteners 305 may come in standardized sizes and be used to assemble frame mediums of different profile designs so long as a profile design size matches a standardized size.

Figure 4:
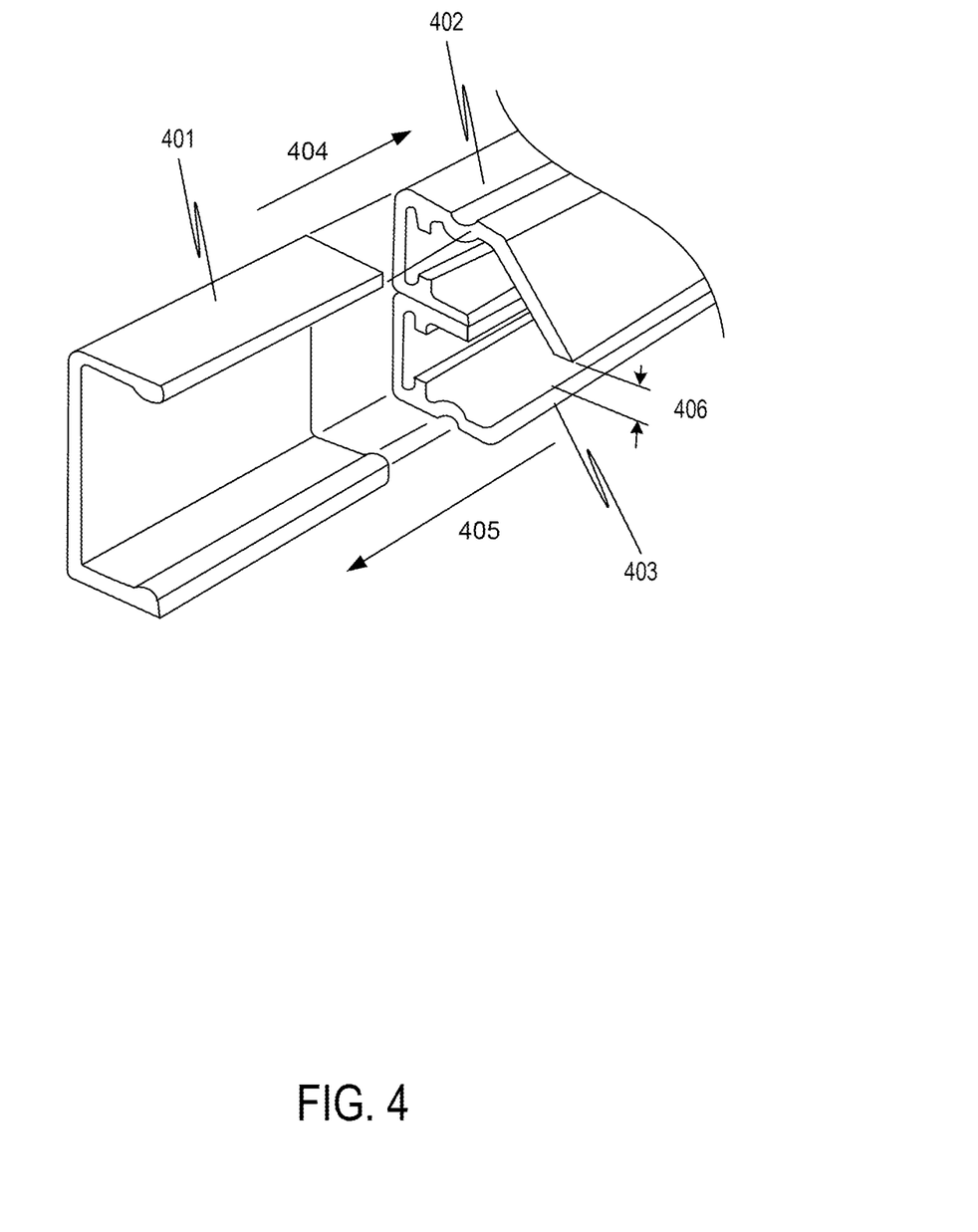
FIG. 4 illustrates an enlarged schematic view showing how an extruded clip may secure media frames together.

Referring now to FIG. 4 an enlargement of a schematic diagram illustrates an extruded frame fastener 401, such as a C shaped clip, releasably securing an upper media frame 402 and a lower media frame 403 together in a position relative to each other that a filter media gap 406 is formed that allows a filter media to be compressively secured between the upper media frame 402 and lower media frame 403. A direction of movement of the frame fastener 401 to engage 404 or disengage 405 the upper media frame 402 and lower media frame 403 to releasably secure them together is also illustrated.

Figure 5:
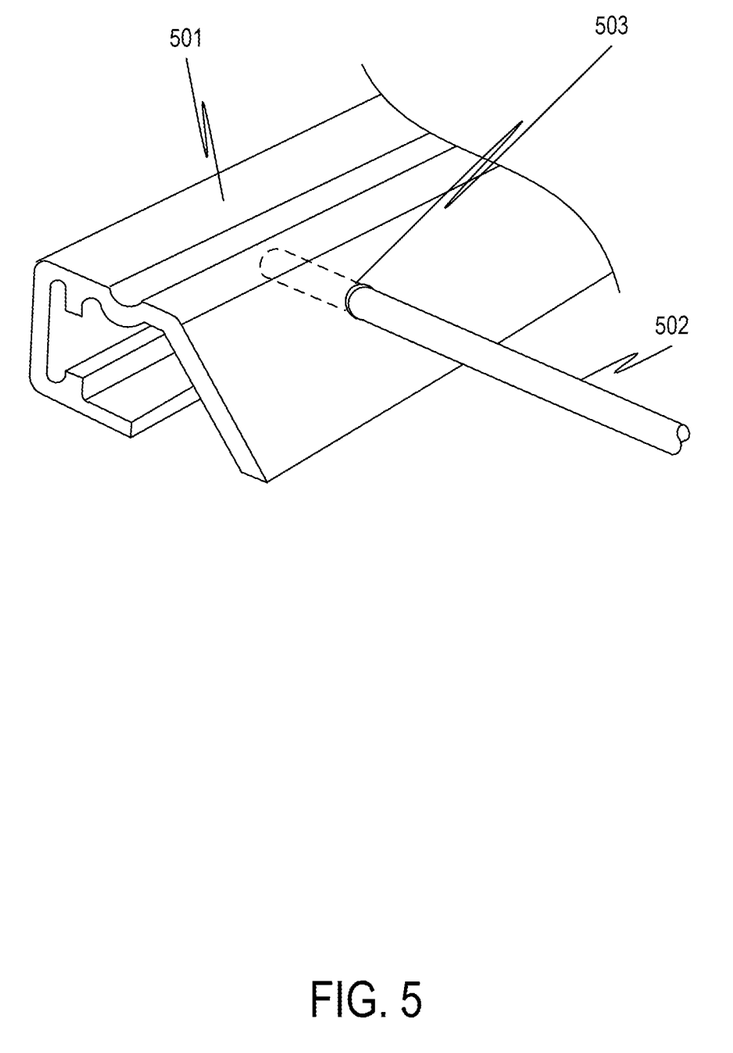
FIG. 5 illustrates a schematic view of filter media supports according to some embodiments of the present invention.

Referring now to FIG. 5 illustrates a first end of a media support 502 installed in a media support receiver 503 formed into a first section of media frame 501 according to some embodiments of the present the invention. A second end of the media support 502 (not illustrated in FIG. 5) is preferably installed in another media support receiver 503 formed into a second section of media frame 501 (not illustrated in FIG. 5) that is parallel to the first section of media frame 501. As illustrated, the media support 502 includes a metal wire or plastic dowel and may be flexed or otherwise deformed from a straight linear shape during insertion into the media support receiver and returned to a straight linear shape after the media support 502 is installed in the media support receiver 503.

Figure 6:
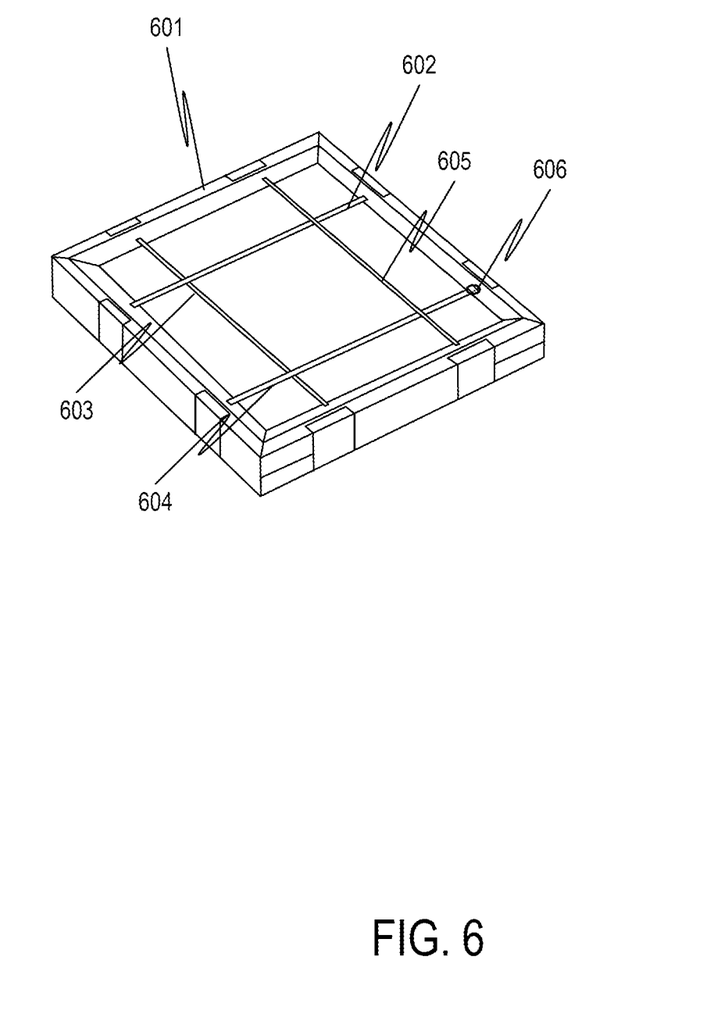
FIG. 6 illustrates interlacing of media supports.

Referring now to FIG. 6 illustrates a complete media frame 601 with interlaced media supports 602-605 spanning an interior area formed by the complete media frame 601. While the media supports 602-605 are illustrated in a configuration of parallel and perpendicular media supports 602-605, any configuration conducive to adequate support of the filter media is within the scope of the present invention. In addition, FIG. 6 illustrates four media supports 602-605, but additional media supports 602-605 or fewer media supports 602-605 are also within the scope of the present invention.

During operation of an HVAC unit into which the media frame 601 is installed the air flow is in a single direction such that media supports 602-605 are only required on one side of a filter media (not illustrated in FIG. 6). However, media supports on both sides (upper side and lower side) of the filter media is useful for handling and for preventing sagging due to gravity during time period in which the air flow is not flowing.

In another aspect, interlacing the media supports 602-605 serves to secure the media supports 602-605 from movement and rattling which may be disconcerting to persons nearby. Preferably, the media supports 602-605 are cut to that are long enough to prevent the media supports 602-605 from moving to one side of the media frame 601 and falling out of an opposite side of the media frame 601. Preferably, a small amount of bend is required to insert the media supports 602-605 into a media support receiver 606. In some embodiments, a grommet may line the edge of a media support receiver 606 to snugly fit the media supports 602-605 and minimize movement and vibration of the media supports 602-605.

Figure 7:
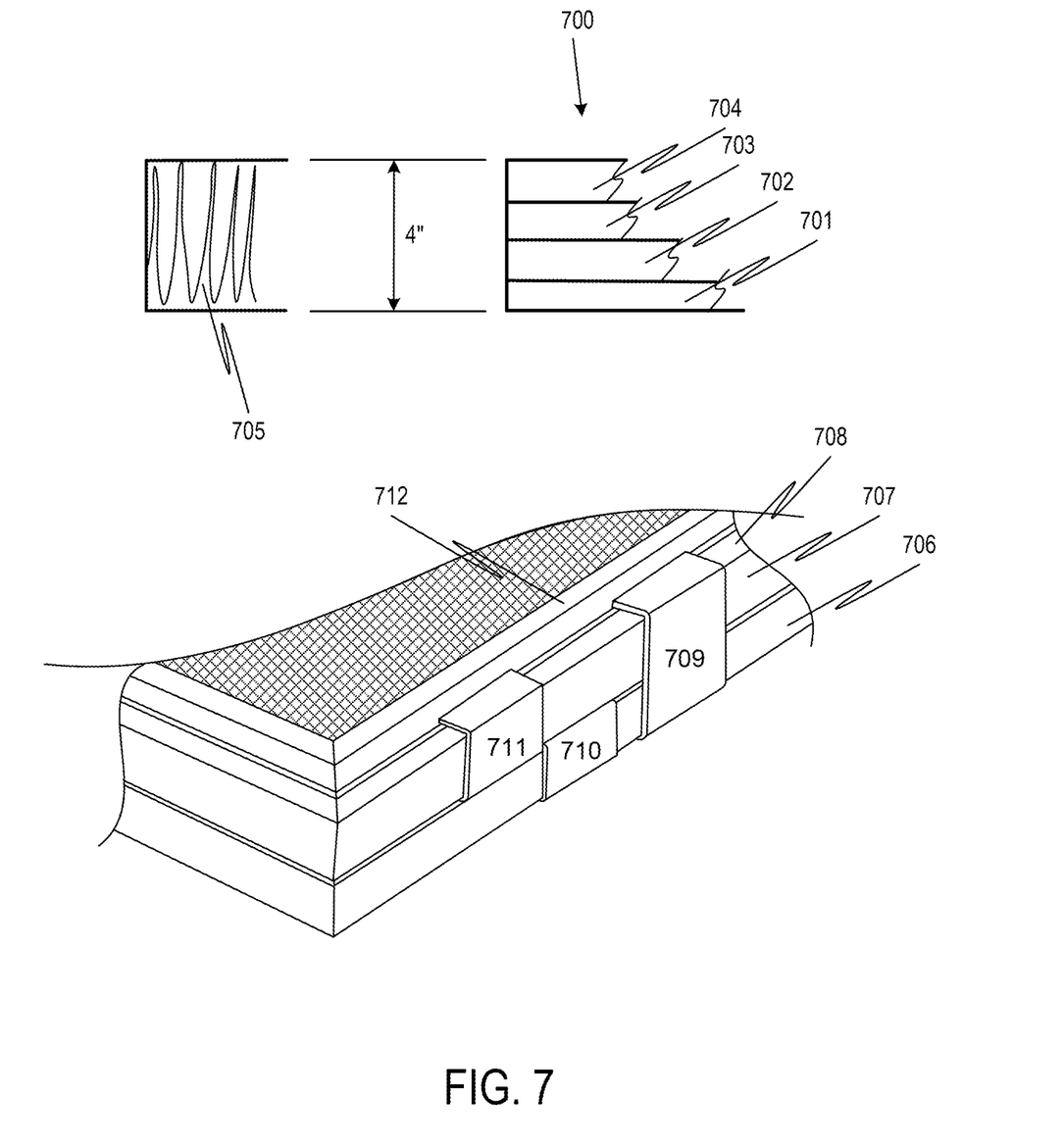
FIG. 7 illustrates multiple filter frames.

Referring now to FIG. 7, in another aspect, in some embodiments, a user may customize a filter application by stacking multiple filter frames of a thinner thickness to create a filter of a larger thickness in a composite filter solution 700. For example, four media frames with different or same standard filter media thickness may be stacked to construct a filter solution 700 of a desired thickness. As illustrates a media frame of thickness of 0.75 inches 701 and/or a filter media frame of 1.25 inches 702 may be stacked together with two media filters of 1.0 inches 703-704 to construct a filter solution of 4.0 inches to replace a single 4.0 inch filter 705 and fill the filter housing designed for the thicker 4.0 inch filter. This aspect simplifies retrofits in existing air handlers and reduces an amount of stock keeping units (SKUs) that must be inventoried.

In addition, a composite filter solution 700 of stacked filter media, provides a user with the ability to further customize a filter solution 700 design by including disparate filter characteristics at different levels and media frames 701-704 of the composite filter solution 700.

For example, a first media frame 701 may include filter media that filters out coarse airborne particulate, while a second filter media frame 702 includes a filter media that filters out fine airborne particulate, and a third and fourth media frame 703-704 and/or include filter media that house an electrostatic filter media that filter out still finer airborne particulate. During maintenance a user may determine that it is only necessary to replace one or two of the filter media and not all four of the filter media based upon the amount of particulate trapped in each level of filter media frame 701-704.

In some embodiments, multiple filter media frames 706-707 may be combined in a filter housing 712 designed for thicker filters. Such a combination can be made more convenient by unitizing multiple filter frames 706, 707, 708 bound together with extended clips 709-711.

Figure 8:
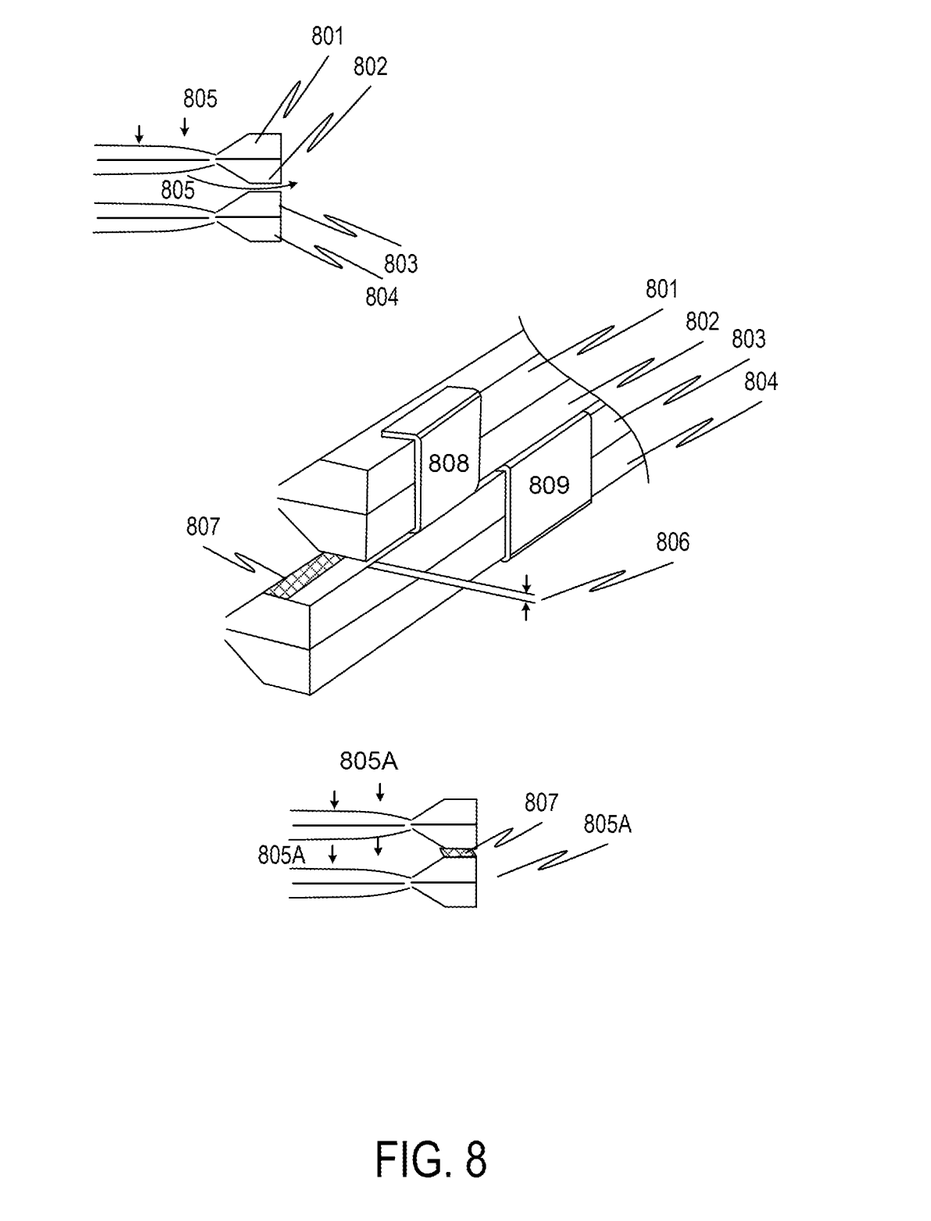
FIG. 8 illustrates use of seal material between adjacent media frames in some embodiments of the present invention.

Referring now to FIG. 8, in still another aspect, in some embodiments, a seal 807 may be included between a set of media frames 801-802 and 803-804 that are joined together with clips 805-806 to prevent air from circumventing a filter process provided by directing air through the media frames 801-804. In some embodiments, a seal 807 includes crushable or otherwise formable material arranged so that it will stop errant airflow 805 from circumventing a filter assembly with media frames 803-804 when the clips 808-809 mating media frame pairs 801-802 and 803-804 separate one media frame 802 from a next media frame 803 creating a gap 806 between media frames 802-803. As illustrated in FIG. 8, a correct airflow 805A may be maintained by inclusion of the seal 807 between appropriate media frames 802-803.

The seal 807 may also be effective for reducing rattles or whistling from errant air flow 805.

Figure 9:
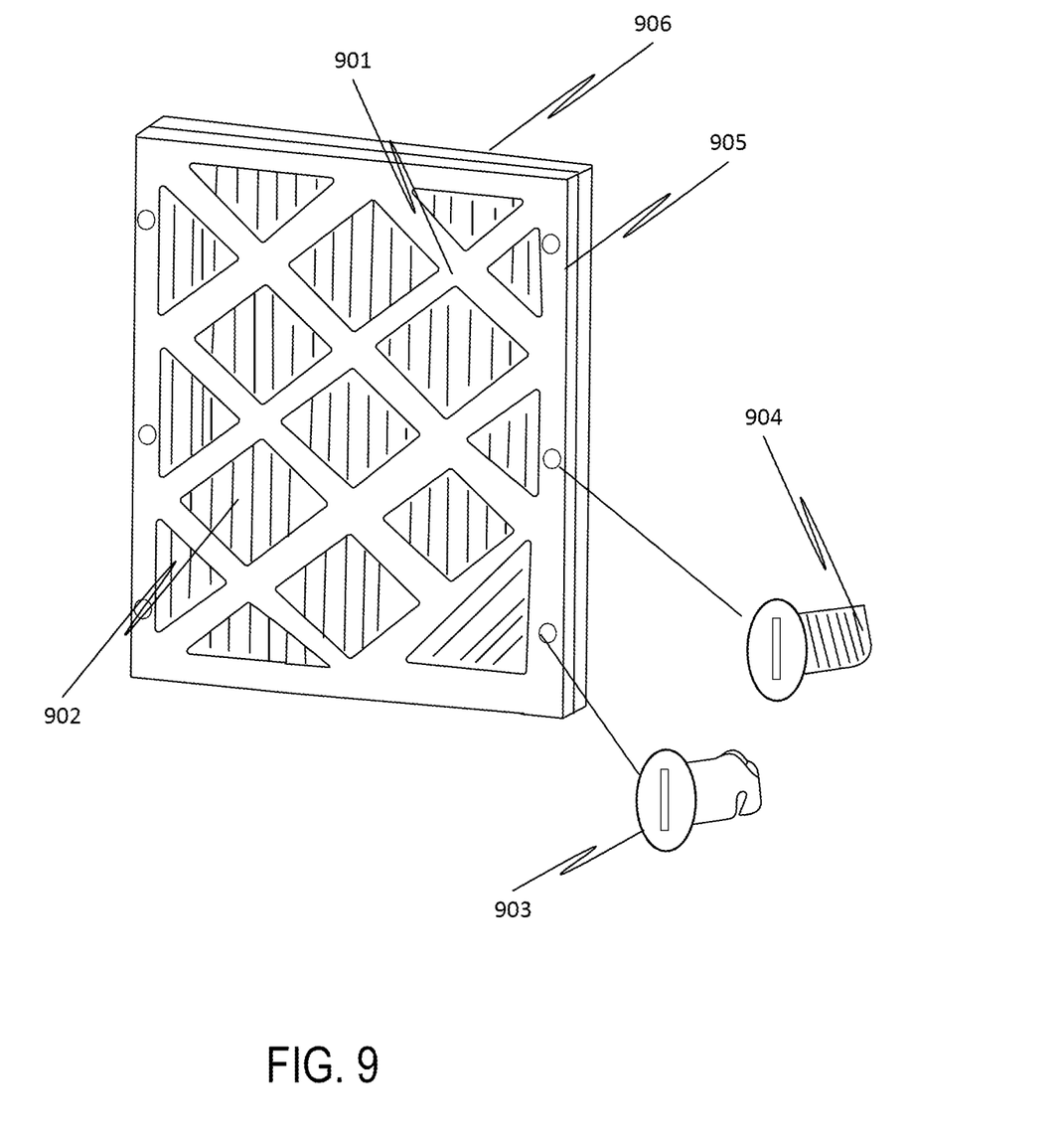
FIG. 9 illustrates formed filter and media support in some embodiments of the present invention.

Referring now to FIG. 9, in some embodiments, a lower media frame 905 and an upper media frame 906 may include a formed media support 901, such as, for example a media support 901 manufactured via plastic molding, additive manufacture, or stamped metal forming. In such examples, a filter media 902 may be contained within the lower media frame 905 and the upper media frame 906. The lower media frame 905 and the upper media frame 906 may be fastened together with clips or fasteners. Fasteners may include, by way of non-limiting example, a threaded fastener 904 or a quick disconnect fastener 903. In some embodiments, fasteners 903-904 may also be used to join lower media frame 905 and the upper media frame 906 that do not include formed media support.

Figure 10:
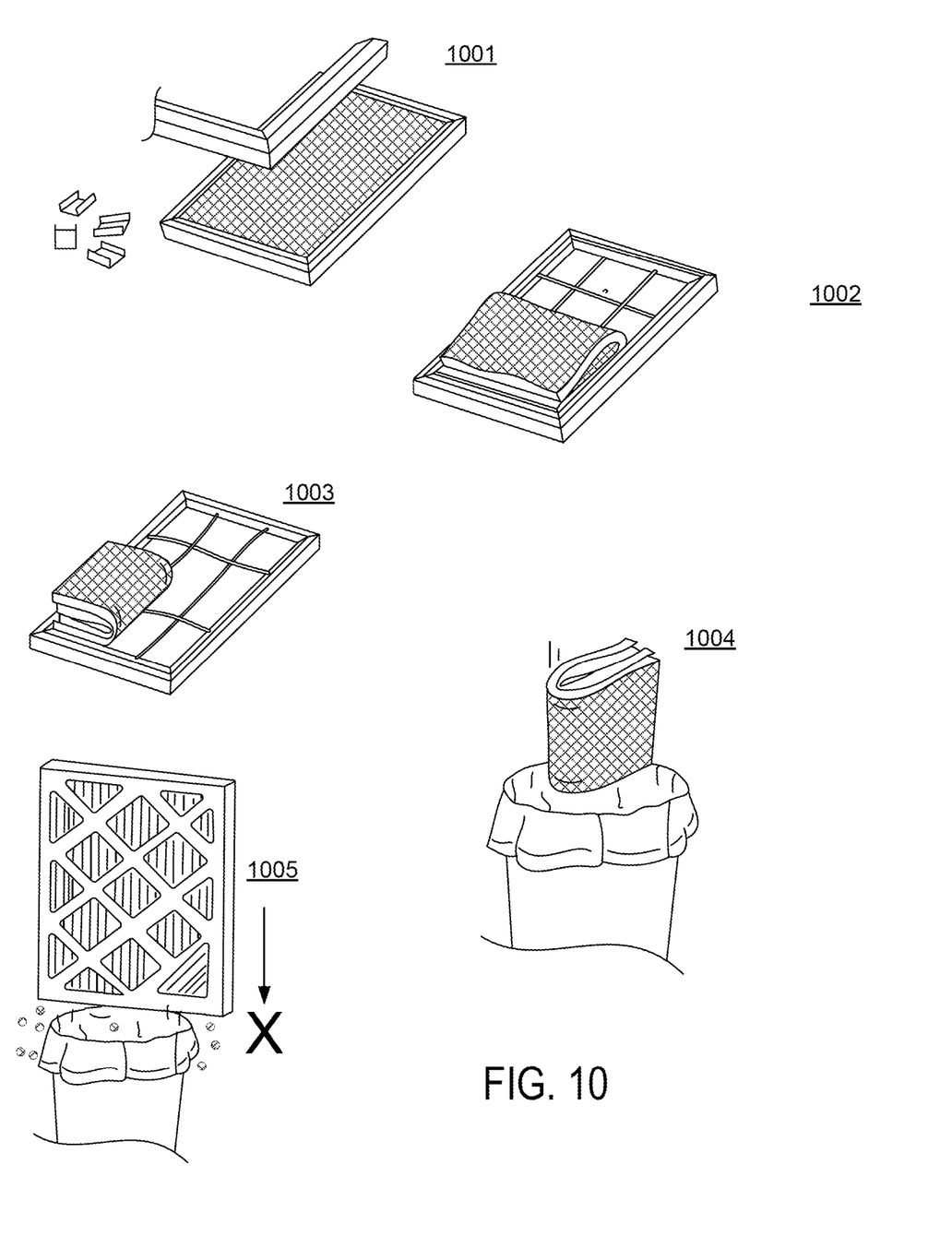
FIG. 10 illustrates method steps that may be executed in some embodiments of the present invention.

Referring now to FIG. 10 a process illustrates how the apparatus described herein may be used to implement a relatively simple and clean changing of filter media, wherein the disposal of a replaceable filter media is shown to be more hygienic than disposing of a conventional cardboard frame filter, according to some embodiments of the present invention.

At method step 1001, a user customizable HVAC filter may be laid down with the clean side down (which generally is a side with media support), remove the frame fasteners, and separate the upper media frame from the lower media frame.

At method step 1002, a soiled surface of the filter media is folded onto itself in a first direction.

At method step 1003, the filter media may be folded in a second direction, trapping collected particulate, hair, pollen, and other collected debris between the folds.

At method step 1004, the folded flexible filter media may then be conveniently disposed of in a standard sized household trash receptacle.

At method step 1005 it is illustrated that a typical card stock type filter will not fit in many common household trash receptacles and a soiled card stock type filter will drop dust and debris as it is carried.

In the preceding sections, detailed descriptions of examples and methods of the disclosure have been described. The description of both preferred and alternative examples though thorough are exemplary only, and it is understood that to those skilled in the art that variations, modifications, and alterations may be apparent. It is therefore to be understood that the examples do not limit the broadness of the aspects of the underlying disclosure as defined by the claims.

CONCLUSION

A number of embodiments of the present disclosure have been described. While this specification contains many specific implementation details, they should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. Apparatus for a user customizable heating ventilation and air conditioning (HVAC) filter, the apparatus comprising:
  a) a lower media frame comprising a lower surface, a right lower media frame side, a left lower media frame side, a front lower media frame side and a back lower media frame side, the lower media frame interacts with a lower equipment engagement feature of an HVAC unit, the lower equipment engagement feature of suitable size and shape to be secured in the HVAC unit into which a customizable HVAC filter cartridge is inserted, the lower media frame additionally comprising a lower media securing compressor around an interior circumference of the lower media frame;
  b) an upper media frame comprising an upper surface, a right upper media frame side, a left upper media frame side, a front upper media frame side and a back upper media frame side, the upper media frame interacts with an upper equipment engagement feature of the HVAC unit, the upper equipment engagement feature of suitable size and shape to be engaged with the HVAC unit into which the customizable HVAC filter cartridge is inserted, the upper media frame additionally comprising an upper media securing compressor around an interior circumference or boundary of the upper media frame;
  c) a first media layer fixedly securable between the lower media securing compressor and the upper media securing compressor;
  d) a first media support spanning between one of: the right lower media frame side to the left lower media frame side, and the right upper media frame side to the left upper media frame side;
  e) a second media support spanning between one of: the front lower media frame side to the back lower media frame side, and the front upper media frame side to the back upper media frame side; and
  f) multiple frame fasteners engageable with the lower media frame and the upper media frame to releasably secure the lower media frame to the upper media frame with the first media layer between the lower media securing compressor and the upper media securing compressor.

2. The apparatus of claim 1 wherein the lower media frame and the upper media frame comprise a polygon shape with four sides and four interior angles with a sum of the four interior angles equal to 90 degrees.

3. The apparatus of claim 1 wherein the right lower media frame side and the left lower media frame side are parallel to each other and the front lower media frame side and the back lower media frame side are parallel to each other.

4. The apparatus of claim 1 additionally comprising a flexible edge around one of the upper media frame and the lower media frame.

5. The apparatus of claim 1 additionally comprising a top surface of the upper media frame parallel to a bottom surface of the lower media frame while the upper media frame is releasably secured to the lower media frame.

6. The apparatus of claim 5 wherein at least one of the upper media frame and the lower media frame comprises a perimeter surface at a 90 degree angle to the top surface of the upper media frame and the bottom surface of the lower media frame.

7. The apparatus of claim 1 wherein at least one of the multiple frame fasteners comprises a C shaped clip with a top surface and a bottom surface of the C shaped clip perpendicular to a side surface of the C shaped clip.

8. The apparatus of claim 7 additionally comprising a gasket over the C shaped clip and at least one of the lower surface of the lower media frame and an upper surface of the upper media frame.

9. The apparatus of claim 7 wherein the top surface of the C shaped clip is coplanar with the upper surface of the upper media frame while it engages with the upper media frame.

10. The apparatus of claim 7 wherein the bottom surface of the C shaped clip is coplanar with the lower surface of the lower media frame while it engages with the lower media frame.

11. The apparatus of claim 1 wherein at least one of the multiple frame fasteners comprises a threaded fastening device.

12. The apparatus of claim 11 wherein the at least one of the multiple frame fasteners is either coplanar, or below a planar surface, of one of the lower surface of the lower media frame and the upper surface of the upper media frame while the at least one of the multiple frame fasteners engages with the upper media frame and the lower media frame.

13. The apparatus of claim 1 wherein the at least one of the multiple frame fasteners comprises a quick release fastener capable of securing the upper media frame to the lower media frame via placement of the quick release fastener into a receiver and rotation of the quick release fastener for 180 degrees or less.

14. The apparatus of claim 1 wherein the first media support and the second media support are fashioned out of metal wire interweaved to provide additional stability.

15. The apparatus of claim 1 wherein at least one of the first media support and the second media support comprises a plastic dowel.

16. The apparatus of claim 1 additionally comprising a compilation of multiple pairs of the lower media frame and the upper media frame stacked one on top of the other with a disparate respective filter media secured between each of the multiple pairs of the lower media frame and the upper media frame.

17. A method of filtering air in a heating ventilation and air conditioning unit, the method comprising the steps of:
  a) constructing a first customizable HVAC filter cartridge by containing a filter media between a first lower media frame and a first upper media frame, the first lower media frame comprising a first lower surface, a first right lower frame media side, a first left lower media frame side, a first front lower media frame side and a first back lower media frame side, the first lower media frame interacts with a first lower equipment engagement feature of an HVAC unit, the first lower equipment engagement feature of suitable size and shape to be secured in the HVAC unit into which the first customizable HVAC filter cartridge is inserted, the first lower media frame additionally comprising a first lower media securing compressor around an interior circumference of the first lower media frame, the first upper media frame comprising a first upper surface, a first right upper media frame side, a first left upper media frame side, a first front upper media frame side and a first back upper media frame side, the first upper media frame interacts with a first upper equipment engagement feature of the HVAC unit, the upper equipment engagement feature of suitable size and shape to be engaged with the HVAC unit into which the first customizable HVAC filter cartridge is inserted, the first upper media frame additionally comprising a first upper media securing compressor around an interior circumference or boundary of the upper media frame;
  b) constructing a second customizable HVAC filter cartridge by containing a second filter media between a second lower media frame and a second upper media frame, the second lower media frame comprising a second lower surface, a second right lower frame media side, a second left lower media frame side, a second front lower media frame side and a second back lower media frame side, the second lower media frame interacts with a second lower equipment engagement feature of the HVAC unit, the second lower equipment engagement feature of suitable size and shape to be secured in the HVAC unit into which the second customizable HVAC filter cartridge is inserted, the second lower media frame additionally comprising a second lower media securing compressor around an interior circumference of the second lower media frame, the second upper media frame comprising a second upper surface, a second right upper media frame side, a second left upper media frame side, a second front upper media frame side and a second back upper media frame side, the second upper media frame interacts with a second upper equipment engagement feature of the HVAC unit, the second upper equipment engagement feature of suitable size and shape to be engaged with the HVAC unit into which the second customizable HVAC filter cartridge is inserted, the second upper media frame additionally comprising a second upper media securing compressor around an interior circumference or boundary of the second upper media frame; and
  c) releasably securing the first customizable HVAC filter cartridge to the second customizable HVAC filter cartridge in a manner that permits airflow through the first customizable HVAC filter cartridge to the second customizable HVAC filter cartridge in the heating ventilation and air conditioning unit.

18. The method of claim 17 additionally comprising the steps of:
  a) fixedly securing a first media layer between the first lower media securing compressor and the first upper media securing compressor; and
  b) fixedly securing a second media layer between the second lower media securing compressor and a second upper media securing compressor.

19. The method of claim 18 additionally comprising the step of engaging multiple frame fasteners to the first customizable HVAC filter cartridge to the second customizable HVAC filter cartridge.

* * * * *